US009497600B2

(12) United States Patent
Burke et al.

(10) Patent No.: US 9,497,600 B2
(45) Date of Patent: Nov. 15, 2016

(54) SERVICE CHAINING

(75) Inventors: Paul M. Burke, Bedford, NH (US);
Gregory R. Evans, Frisco, TX (US);
David R. Isaacson, Melrose Park, PA
(US); Sandra L. Schillinger,
Flemington, NJ (US); **Gerald W.
Winsor**, Cupertino, CA (US)

(73) Assignee: **HEWLETT PACKARD
ENTERPRISE DEVELOPMENT LP**,
Houston, TX (US)

(*) Notice: Subject to any disclaimer, the term of this patent is extended or adjusted under 35 U.S.C. 154(b) by 2204 days.

(21) Appl. No.: 11/262,118

(22) Filed: Oct. 28, 2005

(65) Prior Publication Data
US 2007/0116224 A1   May 24, 2007

(51) Int. Cl.
*H04M 3/42* (2006.01)
*H04W 4/10* (2009.01)
*H04L 29/06* (2006.01)

(52) U.S. Cl.
CPC .......... *H04W 4/10* (2013.01); *H04L 29/06027* (2013.01); *H04L 65/1083* (2013.01); *H04L 65/1096* (2013.01)

(58) Field of Classification Search
CPC ........... H04W 76/025; H04W 76/027; H04W 76/043; H04W 84/18; H04W 88/04; H04W 88/16; H04W 8/02; H04W 92/18; H04M 3/5183; H04M 3/5191; H04M 15/66; H04M 1/0256; H04M 1/72527; H04M 1/72536
USPC ............. 709/227, 203; 455/518, 507, 432.3, 455/414.1
See application file for complete search history.

(56) References Cited

U.S. PATENT DOCUMENTS

| | | |
|---|---|---|
| 6,138,120 A | 10/2000 | Gongwer et al. |
| 6,249,291 B1 | 6/2001 | Popp et al. |
| 6,308,212 B1 | 10/2001 | Besaw et al. |
| 6,484,174 B1 | 11/2002 | Wall et al. |
| 6,567,852 B2 | 5/2003 | Besaw et al. |
| 6,735,294 B2 | 5/2004 | Creamer et al. |
| 6,816,732 B1 | 11/2004 | Farley et al. |
| 6,922,411 B1 | 7/2005 | Taylor |
| 2003/0145054 A1 | 7/2003 | Dyke |
| 2003/0229900 A1 | 12/2003 | Reisman |
| 2004/0034707 A1 | 2/2004 | Royer |
| 2004/0082346 A1 | 4/2004 | Skytt et al. |

(Continued)

FOREIGN PATENT DOCUMENTS

| | | |
|---|---|---|
| EP | 1199872 | 4/2002 |
| EP | 1209849 | 5/2002 |
| WO | WO2005/009018 | 1/2005 |
| WO | WO2005016928 | 2/2005 |

OTHER PUBLICATIONS

Rosenberg J. et al.: "An Application Server Component Architecture for SIP," Internet Engineering Task Force Internet Draft, 2001, pp. 1-40, Dynamicsoft/Columbia University.

(Continued)

*Primary Examiner* — Tu X Nguyen
(74) *Attorney, Agent, or Firm* — Brooks, Cameron, Huebsch, PLLC

(57) ABSTRACT

Systems and methods, including computer executable instructions, are provided for telephony service chaining. One method includes invoking a first application in a telephony session. The method includes retrieving a session context associated with the first application and using the session context an input to invoke a second application in the telephony session.

33 Claims, 14 Drawing Sheets

(56) References Cited

U.S. PATENT DOCUMENTS

2004/0083479 A1    4/2004  Bondarenko et al.
2006/0046759 A1*   3/2006  Yoon et al. .................. 455/518
2008/0086564 A1*   4/2008  Putman et al. ............... 709/227

OTHER PUBLICATIONS

Rosenberg J. et al.: "An Application Server Architecture for Communications Services," White Paper, 2000, pp. A, 1-12, Dynamicsoft.

* cited by examiner

SERVICE CHAINING

INTRODUCTION

Mobile handheld multifunction devices capable of both voice and data functions have proliferated in recent years. Certain mobile devices are capable of different network type connections. Examples of these different network types include the public switched telephony network (PSTN), mobile or wireless voice networks, e.g., public local mobile networks (PLMNs), IP networks, global system for mobile general packet radio service (GSM GPRS) networks, and public wireless local area networks (PwLANs), etc. GPRS is an enhancement to the GSM mobile communications system that supports data packets. GPRS enables continuous flows of IP data packets over the system for such applications as Web browsing and file transfer.

An IP network (e.g., the Internet) is composed of nodes of computers, servers, routers, and communications links, etc. The IP network employs packet-switching technology that decomposes data (e.g., voice, web pages, e-mail messages, etc.) into IP packets. Each packet is then transmitted over an IP network to a destination identified by an IP address and reassembled at the destination. An IP transmission is completed without pre-allocating resources from point to point.

Service and Media platforms, as used in communications networks including mobile networks, ISPs, corporate webservers, advertising agencies, etc., among others, are computing devices that include processor and memory capabilities, e.g., servers and databases. Media platforms can include hardware components, such as trunk lines, switches, routers, etc. Service platforms include servers having computer executable instructions operable thereon for the delivery of web services. Service and media platforms can include software, application modules, firmware, and other computer executable instructions operable thereon to perform various tasks and functions. Modern media platforms are becoming more and more functional, or intelligent, in terms of the services they can provide in cooperation with the software tools that are provided thereon. For example, today the PSTN (SS7 network) includes service control points (SCPs) and other intelligent peripherals which can execute instructions to provide 800 number services, voice mail, and interactive voice recognition (IVR), etc. Communications networks use instant messaging (IM), location services, audio and video conferencing capabilities, etc., in addition to regular phone services.

In a data services delivery environment, there are different top to bottom, or "stove-pipe", type software applications and connection channels. These individual applications and channels each contain their own session context. For example, applications are offered by service providers that run in their own context without the ability to share data between them. Multiple application developers can work together to integrate their applications to offer a superset of application features. However, this process requires the application developers to be involved and may not be economically feasible for a large number of services.

A web services environment has defined methods for sharing data between applications. Web services include web-based applications that dynamically interact with other web applications using open standards that include extensible markup language (XML), universal description, discovery and integration (UDDI), and simple object access protocol (SOAP). Such applications run behind the scenes, one program talking to another, server to server. Telephony systems are typically not defined in web services terms. Thus, coordinating events and context between these two domains has been an issue. While proprietary methods to coordinate events and context between web applications and telephony have been used they are not implemented in a ubiquitous fashion.

DETAILED DESCRIPTION

Embodiments of the present invention provide for systems and methods based on Web Services standards that allow application to be chained, i.e., linked, together using the context of one application as input to another application. One method embodiment includes invoking a first application in a telephony session. The method includes retrieving a session context associated with the first application and using the session context as an input to invoke a second application in the telephony session. For example, this embodiment provides the ability to use a buddy list of a push to talk (PTT) application to call another application such as full duplex conferencing, or location services. According to various embodiments, this is achieved by taking the context, e.g., list of participants, buddy list, location information in a PTT session, etc., and storing this context information in a context repository that can be referenced by a session identification (ID). The session ID is used as the access method to store additional detail about the context, e.g., participants, and then used to form a call to a next application in the chain.

Service Delivery Platform (SDP) Embodiment

Figure 1:
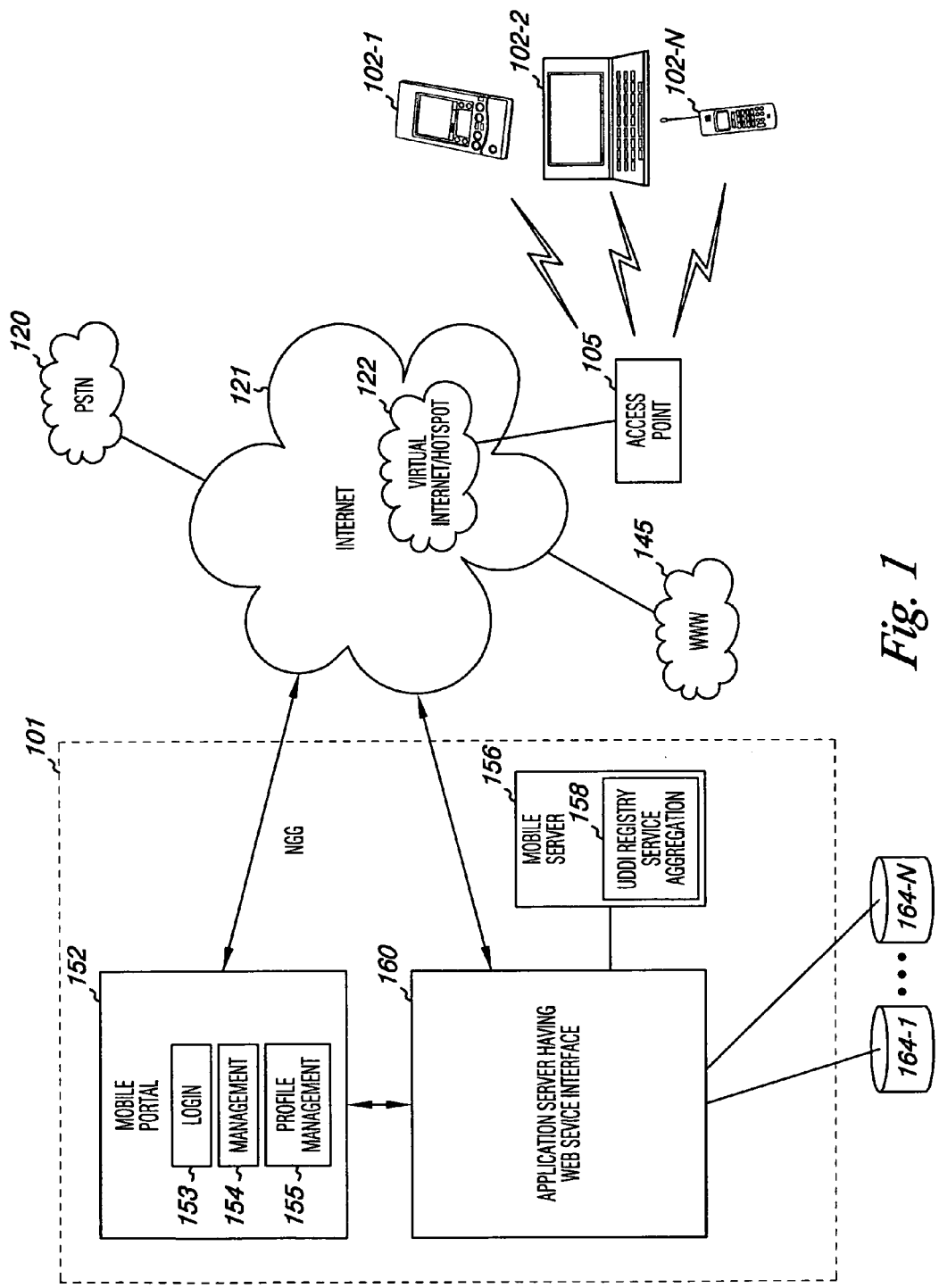
FIG. 1 is an embodiment of a service delivery platform (SDP) having connectivity to different network types.

FIG. 1 is an embodiment of a service delivery platform (SDP) 101 having connectivity to different network types, e.g., the PSTN 120, the Internet 121, wireless networks 105, etc. Wireless devices 102-1, 102-2, . . . , 102-N, e.g., mobile and portable, devices, can include a wireless network interface such as a wireless transceiver, wireless network interface card, etc. These wireless devices, 102-1, 102-2, . . . , 102-N can include wireless enabled personal digital assistants (PDAs), communication handsets such as multifunction phones, Blackberry devices, laptop computers, among others to name a few. Each of these wireless devices 102-1, 102-2, . . . , 102-N may have different features and function capabilities dependent upon a particular device type and applications provided thereon. That is, some devices may include features such as color displays and include application functionality that provides for instant messaging (IM), conferencing, streaming video, push to talk (PTT) capabilities, etc. Embodiments of the invention, however, are not limited to these examples. The wireless devices 102-1, 102-2, . . . , 102-N can include a Java 2 Platform Micro Edition (J2ME) OS which is a version of the Java 2 OS for cellphones, PDAs and consumer appliances. By way of example and not by way of limitation, such wireless devices 102-1, 102-2, . . . , 102-N can connect to access points 105 in a wireless network according to various RF protocols, e.g., global system for mobile general packet radio service (GSM GPRS), evolution data only (EV-DO), Bluetooth, Wi-Fi, etc.

An access point 105 conducting RF communication with such various devices 102-1, 102-2, ..., 102-N, can include a base station in a mobile network and/or a wireless router/transceiver in a wireless LAN and can be a wireless "hotspot" such as a Bluetooth or Wi-Fi access point in a public location. Embodiments of the invention, however, are not limited to these examples. Access points 105 can provide a wireless to wireline connection for access to the Internet 121. A virtual ISP 122 can exist within an Internet connection 121 which can facilitate Internet connection with the wireless access point 105 and handle roaming access, billing, and the like. The Internet 121 can have various connections, e.g., through gateways using TCP/IP, to the PSTN 120, to the world wide web (WWW) 145, etc. The SDP 101 has connections to the Internet 121, the PSTN 120, and the WWW 145 and can include a gateway 150 for handling voice, data, and video traffic, etc. In some embodiments the gateway 150 can provide authentication, access, and billing for connecting to the SDP 101. The gateway 150 to the SDP 101 can interface with a mobile portal 152 which can include a server that deploys portal services, such as login 153, management 154, and profile management 155, to a public web site or internal intranet. FIG. 1 also illustrates a mobile server 156 accessible by the mobile portal 152. The mobile server 156 can include access to a universal description, discovery and integration (UDDI) database 158. The mobile server 156 is accessible by the mobile portal 152 via an application server 160. According to embodiments of the disclosure the application server 160 provides a web services interface. The application server 160 having the web services interface can also access one or more third party databases, e.g., 164-1, ..., 164-N, and/or servers among different networks.

According to embodiments of the invention, program instructions (e.g., computer executable instructions) are provided to the application server 160 having the web services interface, which are executable to retrieve a session context based on a session ID in association with a first application invoked by a wireless device 102-1, 102-2, ..., 102-N in a telephony session. An example for retrieving a session ID in association with a first application invoked by a wireless device 102-1, 102-2, ..., 102-N includes retrieving a session ID created by a call control XML (ccXML) application (shown as 380 in FIG. 3) and as described in a copending, commonly assigned patent application, entitled "Telephony and Web Service Coordination", application Ser. No. 11/262,097, filed on even date herewith.

Figure 3:
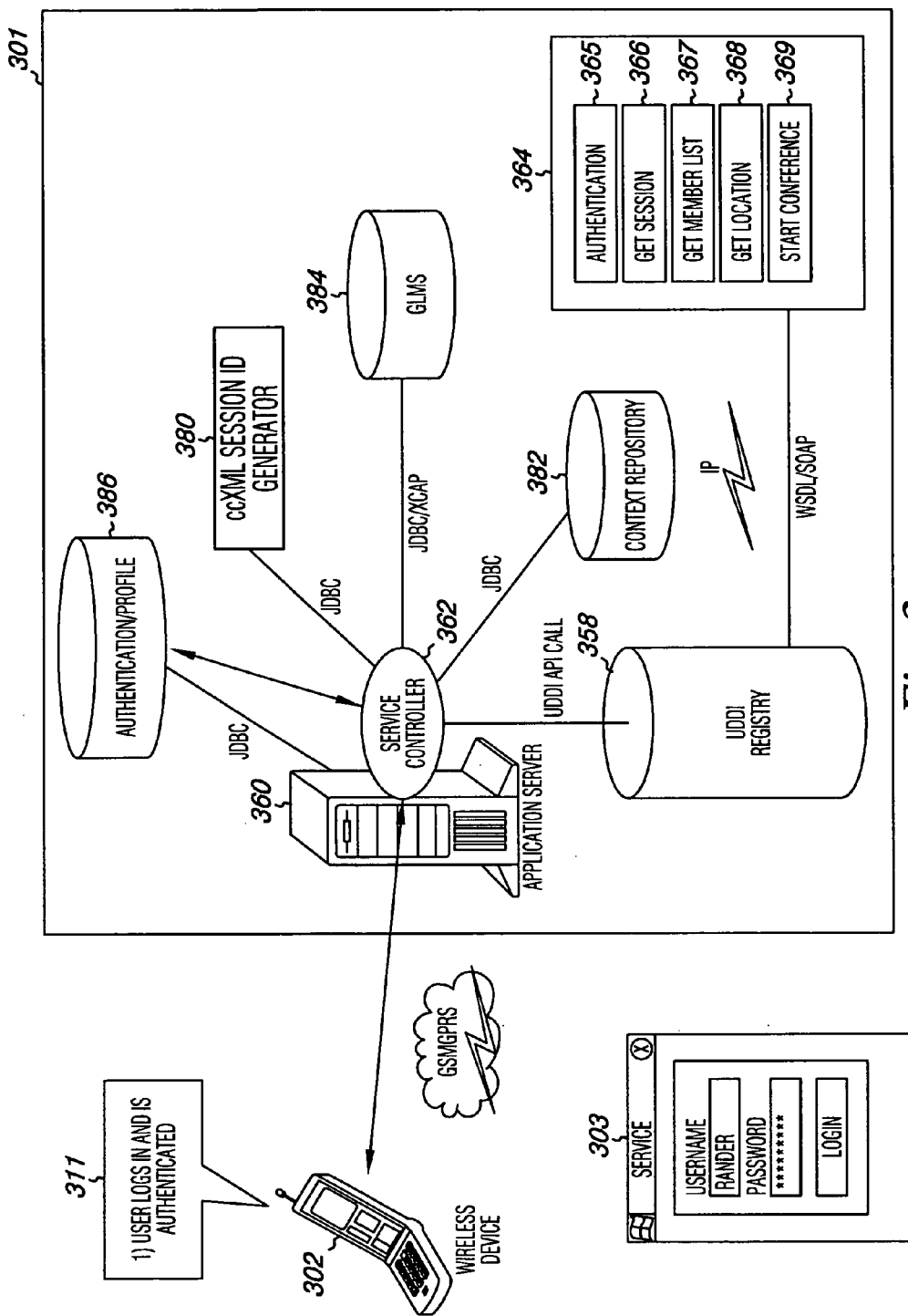
FIGS. 3-10 illustrate one architecture embodiment along with an example service flow embodiment for chaining services in a telephony session.

The program instructions execute to store session context for the first application based on the session ID in a context repository (shown as 382 in FIG. 3). To illustrate, a telephony application such as a push to talk (PTT) application can be provided to a wireless device 102-1, 102-2, ..., 102-N such as an IPAQ, available from Hewlett Packard, as a network operator service through a network provider such as Verizon, Sprint-Nextel, Vodafone, NTT DoComo, KDDI, T-Mobile, Cingular, etc. This application on the wireless device 102-1, 102-2, ..., 102-N can invoke a PTT telephony session through the network provider. As described in copending application "Telephony and Web Service Coordination", this telephony session can be coordinated through the service delivery platform (SDP) to create a session ID by using a ccXML application.

The session context in the PTT session can include the participants to the PTT session, the participant's phone numbers, a buddy list provided by the PTT telephony application, etc. However, embodiments are not so limited. And, as will be described below, the session context can include such information as location information, profile information, email and text messaging addresses, etc.

The program instructions can then execute to use the session context as an input to invoke a second application in the telephony session. According to various embodiments, the first and the second applications can be atomic applications and can include web services applications. Web services applications, as mentioned above, include web-based applications that dynamically interact with other web applications using open standards that include extensible markup language (XML), universal description, discovery and integration (UDDI), and simple object access protocol (SOAP). Such applications run behind the scenes, one program talking to another, server to server. Use of the term "atomic" herein refers to the fact that in certain contexts in software a set of operations are handled completely. That is, all of the operations complete, or none of them do. Such a set of operations is usually called a "transaction", and the completion of them in this fashion is said to be "atomic" or "transactional".

Thus to continue the above example (as will be described in greater detail in FIGS. 3-10) program instructions can execute to use a buddy list from the PTT session context as an input to invoke a location web service application and/or a conferencing web service application, etc.

SDP/Development Tool Example Embodiment

Figure 2A:
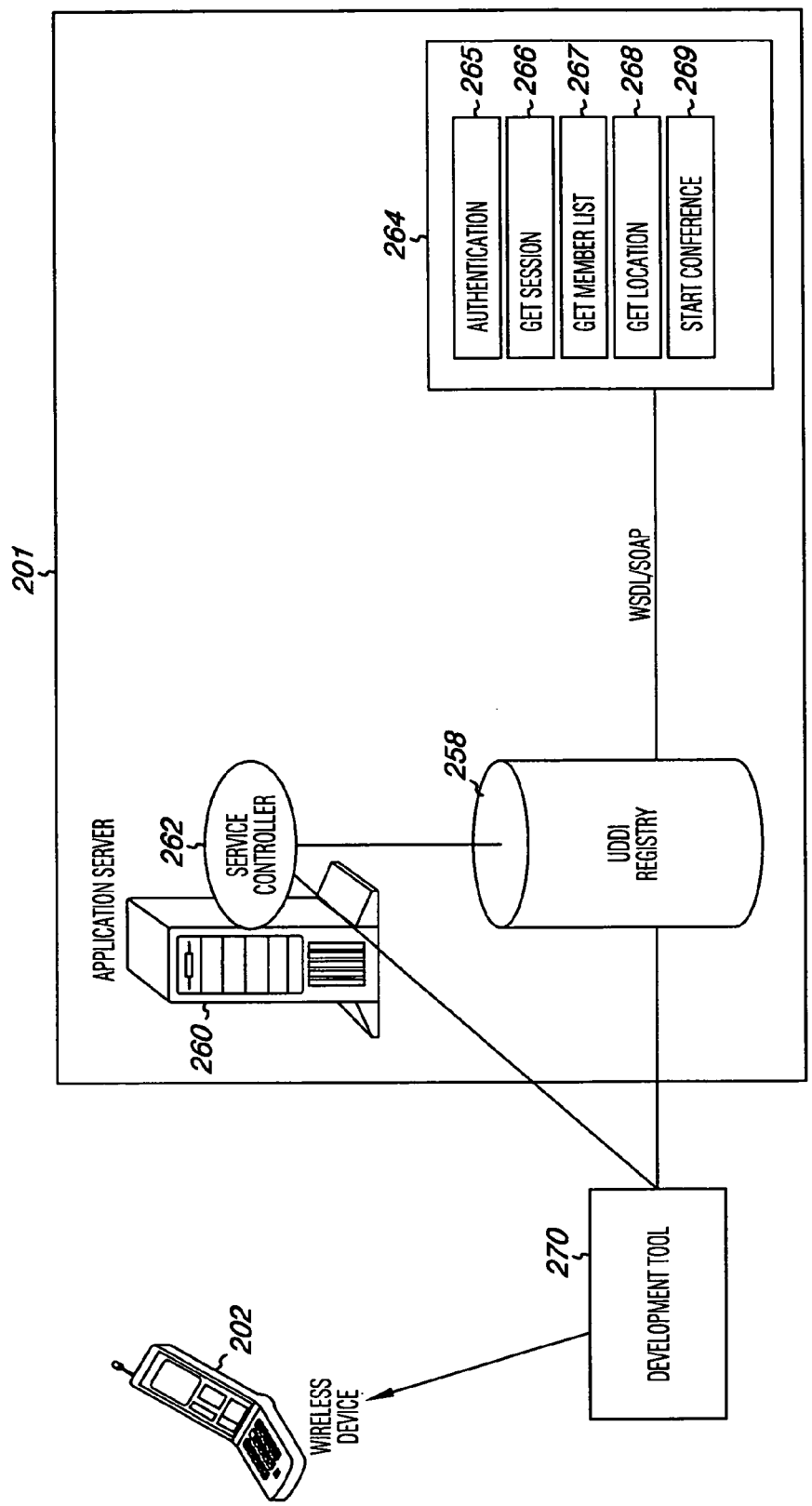
FIG. 2A is an embodiment of an application server on a SDP interacting with a development tool.
Figure 2B:
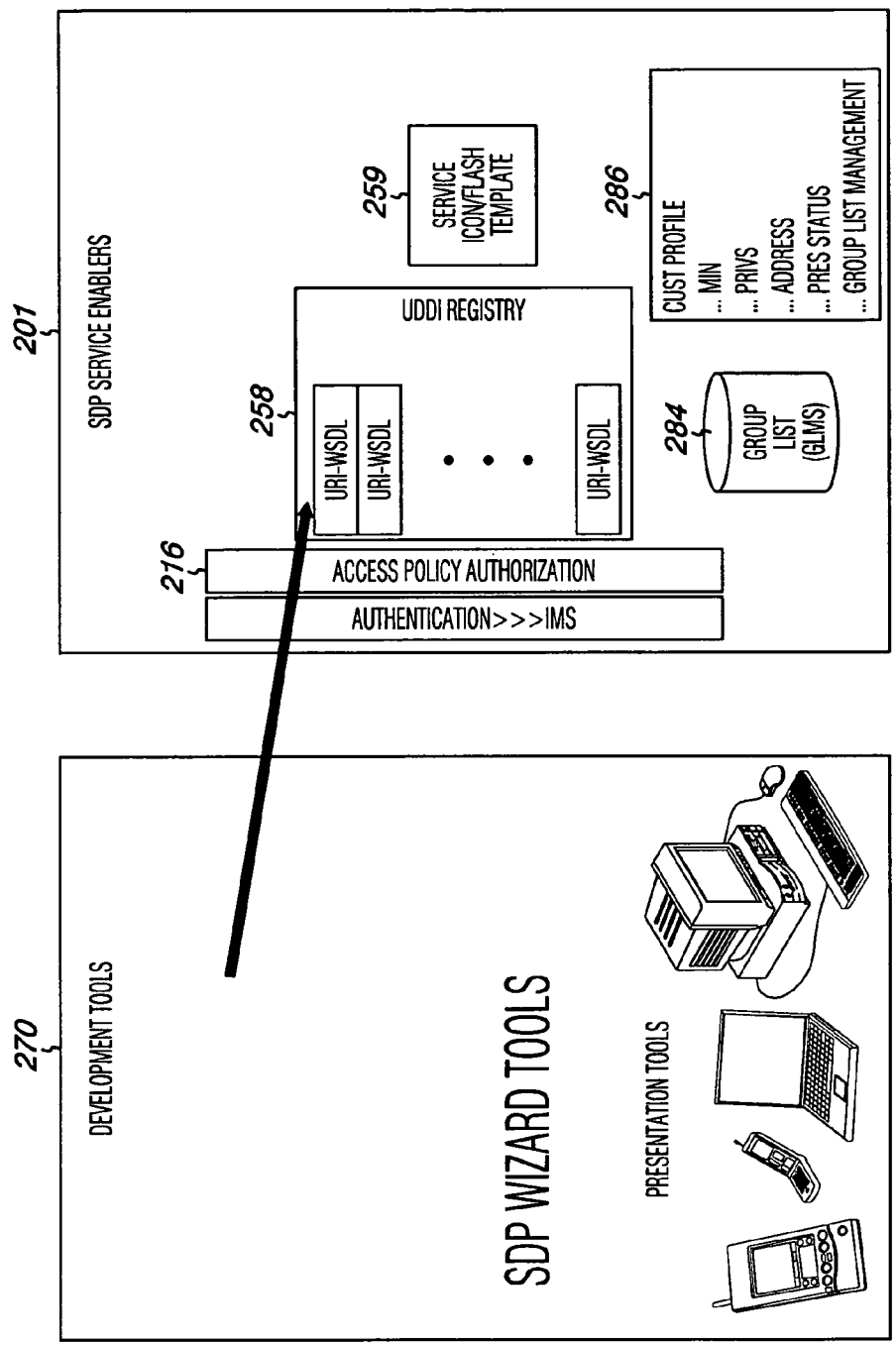
FIG. 2B is another embodiment for interaction between a development tool and a SDP.

FIG. 2A illustrates an embodiment of an application server 260, provided as part of a SDP 201, interacting with a development tool 270. FIG. 2B is another embodiment for interaction between a development tool and a SDP. As described in FIGS. 2A and 2B, applications are used to expose one or more operator services as web services through a service controller 262 on the application server 260. In the web services environment a universal description, discovery and integration (UDDI) registry 258 is used to provide information on access to web based applications. The UDDI registry 258 is accessed by the service controller 262 to make the web services available through the registry 258 accessible to the development tool 270.

Examples of operator services include instant messaging (IM), conferencing, streaming video, push to talk (PTT) capabilities, etc. As described in the copending application "Telephony and Web Service Coordination", ccXML can be used to coordinate events in a telephony based system to events occurring in web services based application and provides a method to coordinate the session context between these different environments. That is, ccXML applications are written and made accessible through the application server 260 to handle and execute these various operator services. Further, ccXML is used to form a session ID that can be used by the telephony environment as well as the web services environment. Push to talk (PTT) over cellular is one example of a telephony event. ccXML provides call control methods described in XML that provide telephony systems the ability to use XML to control time division multiplexing (TDM) or session initiation protocol (SIP) channels to perform the above mentioned telephony events, actions, or tasks, e.g., call start, call transfer, call end, etc. ccXML also employs the concept of a session ID to coordinate these actions in the telephony environment.

The embodiment of FIG. 2A illustrates that the application server 260 has a service controller 262 which can execute instructions to look up and access web services with the use of a UDDI registry 258. Examples of web services are illustrated at 264 and include web applications that can be executed to provide authentication services 265, session services 266, member list information 267 and services such as a "buddy list", location services 268, conference services 269, etc. One or more of these web services may be third party features, i.e., resulting from applications written by or offered by a third party different from a given operator. The UDDI 258 interacts with such services using web services definition language (WSDL) and simple object access protocol (SOAP).

FIG. 2B is another embodiment for interaction between a development tool 270 and a SDP 201 illustrating in more detail exposing web services on the SDP 201. As mentioned above in connection with FIG. 2A the service controller 262 is provided with program instructions which execute to access a UDDI registry 258, which is a database that provides location and access information to web services through uniform resource identifiers (URIs) associated with web services description language (WSDL). As noted above, WSDL is an XML-based language for defining web services. The WSDL describes the protocols and formats used by the web service. WSDL descriptions can be housed in a UDDI registry 258 in association with URIs as illustrated in FIG. 2B. The WSDL can provide pointers to various web services applications such as a group list management service (GLMS) 284. Embodiments of web services are not limited to this example and others are described in FIG. 3 below, for example.

The SDP 201 in FIG. 2B can include program instructions that execute to provide authentication, access policy, and authorization 265. These program instructions can execute to access an authentication profile 286, e.g., a customer profile, that can include such information as a mobile user's mobile identification number (MIN), a mobile user's private information, address information, presence status, etc.

Once these operator services are made accessible as web services through the application server 260, program instructions can be written to expose the web services to a development tool 270 having the ability to associate a web service implemented in the development tool 270 with a session ID according to various presentation tools, e.g., a PDA, mobile phone, laptop, PC, etc. One example of such a development tool 270 includes a Macromedia Flash MX development tool as available from Macromedia, Inc. Using such a development tool, an application developer, based on access rights can build, i.e., write, applications that embed the web services that are exposed in the SDP 201. The developer also embeds in the application the ability for services that are implemented to be associated with a session ID. In the embodiment of FIG. 2B, program instructions are also provided to the SDP 201 which can execute to access a service ICON/flash template 259 in order to associate various web services as ICON features within the application. Further, the application can then be delivered to and stored upon a wireless device 202.

Architecture and Service Flow Embodiment

FIGS. 3-10 illustrate one architecture embodiment along with an example service flow embodiment for chaining services in a telephony session. It is noted that figures herein follow a numbering convention in which the first digit or digits correspond to the drawing figure number and the remaining digits identify an element or component in the drawing. Similar elements or components between different figures may be identified by the use of similar digits. For example, 260 may reference application server 260 in FIGS. 2A and 2B, and also be referenced as 360 in FIG. 3. Thus, discussion of features and/or attributes for hardware, software and/or firmware with a component in one figure can also apply to that component shown in one or more additional figures.

In FIG. 3, a user of a wireless device 302 could begin an application created and provided to the wireless device 302 as described in FIGS. 2A and 2B. For example, as shown in block 311 a user could launch the particular application on their wireless device 302 and log in and be authenticated, etc., through connectivity to the application server 360 in the SDP 301. Block 303 illustrates a display, e.g., user menu, as can be provided on the wireless device in association with the particular application. The display example in block 303 illustrates the application labeled as "cool service" and provides a field for a username and password to be entered as part of a log in and authentication process. Also, shown in FIG. 3 are various components to the SDP 301. These components include a service controller 362 associated with the application server 360, and a UDDI registry 358 having access to various web services 364, e.g., authentication services 365, session services 366, member list information 367 ("buddy list"), location services 368, conference services 369, etc. The components illustrated further include a ccXML server 380 (ccXML session ID generator), a context repository 382, a group list management service (GLMS) 384, and an authentication and profile database 386. Each of these components will be explained in subsequent figures.

As illustrated next in FIG. 4, the user of the wireless device 402 can next launch a telephony application from the wireless device 402, e.g., a PTT telephony session (for ease of reference referred to herein as "a first application"). As described in copending application, entitled "Telephony and Web Service Coordination", ccXML is used to form a session ID that can be used to coordinate action in the telephony environment. This action is illustrated in block 411. Additionally, this session ID will be used to extend the functionality of ccXML to web services. That is, by using the ccXML session ID and event handling mechanisms, a session ID can be associated with a session context to coordinate a web services environment with the telephony environment. Hence, according to this methodology, the service controller 462 can be provided with program instructions which execute to retrieve a session ID created by a ccXML application in a ccXML server 480 in association with the first application, e.g., PTT, in a telephony session. The program instructions can use an interface such as Java database connectivity (JDBC) to access the above described ccXML application from the ccXML server 480. As shown at block 411, the program instructions can then execute to forward this session ID to an application running on the wireless device 402, e.g., an application created and provided to the wireless device 402 as described in FIGS. 2A and 2B.

Figure 4:
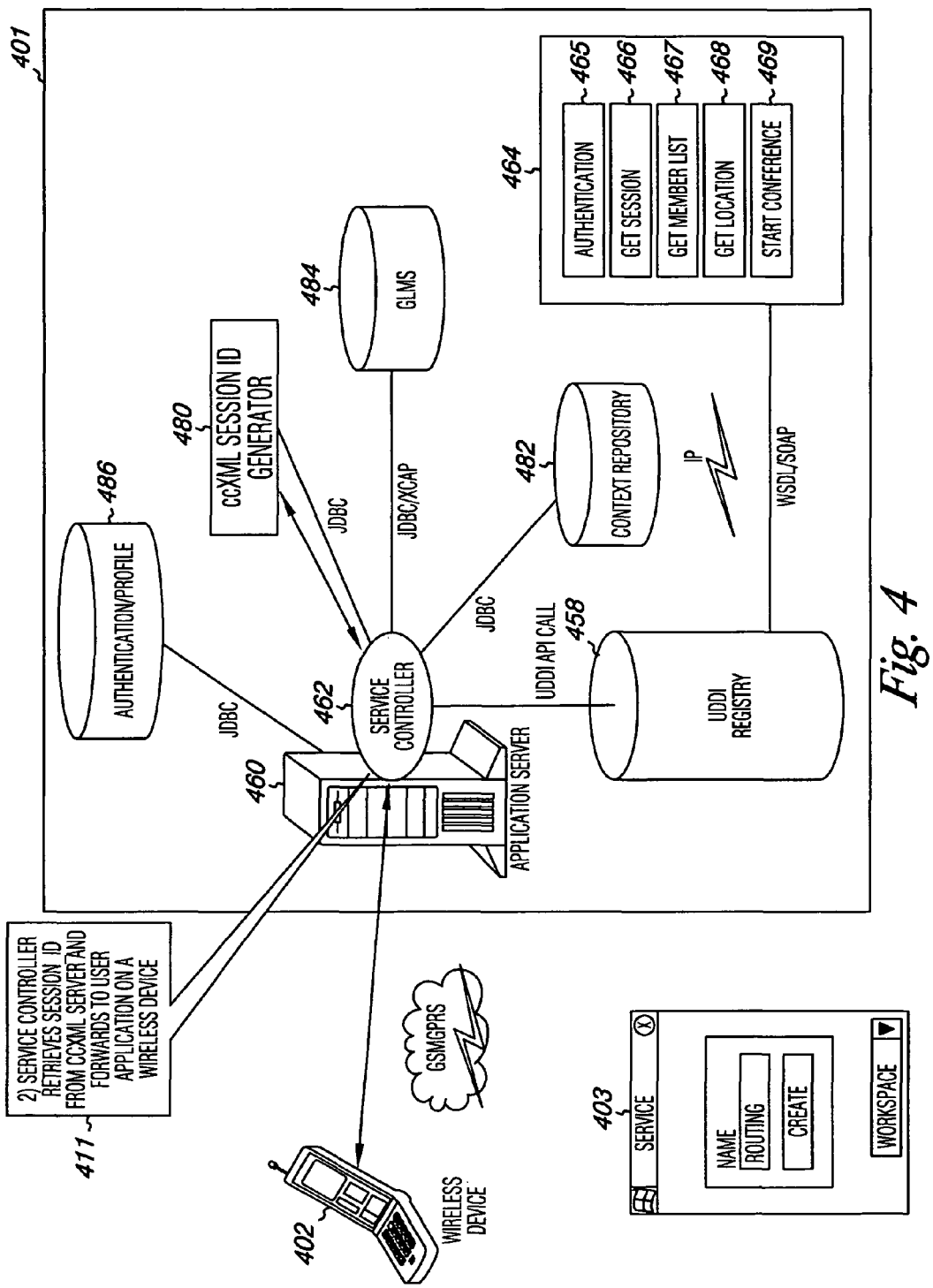

In FIG. 4, a particular application running on the wireless device 402 now provides to a user a menu, e.g., 403, to associate a name with the session ID. In this example, the name provided is "routing". This capability illustrates the fact that the application developer, using the development tool, e.g., tool 270 in FIGS. 2A and 2B, has embedded in the application the ability for web services that are implemented to be associated with a session ID.

Figure 5:
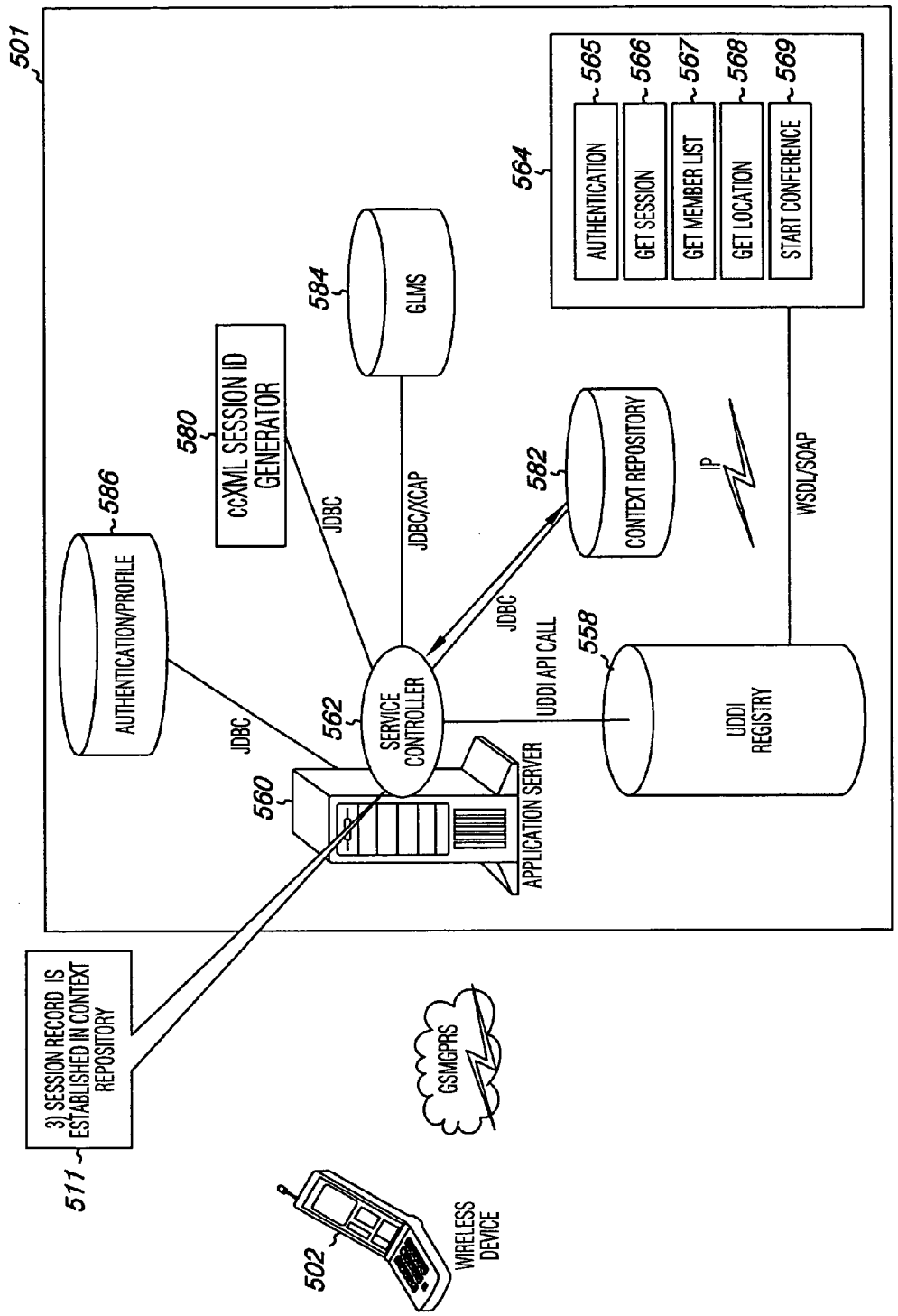

As shown at block 511 in FIG. 5, now that this session ID has been retrieved and associated with the PTT telephony session, the program instructions will execute to store a session context for the PTT telephony session, e.g., the first application, in a context repository 582. In FIG. 5, the program instructions can again use an interface such as JDBC to access and store the session context in the context repository 582. The name "routing" given to the session ID in FIG. 4 effectively identifies the location in the context repository 582 of the session context which is presently stored or may in the future be stored in association with this session ID. By way of example and not by way of limitation, the session context in association with the first application of the telephony session, e.g., the PTT session, can include the participants and their phone numbers to the PTT session. Embodiments, however, are not limited to this example and the first application could include an instant messaging session or other telephony session with the session context including the participants and their text messaging addresses, etc.

Figure 6:
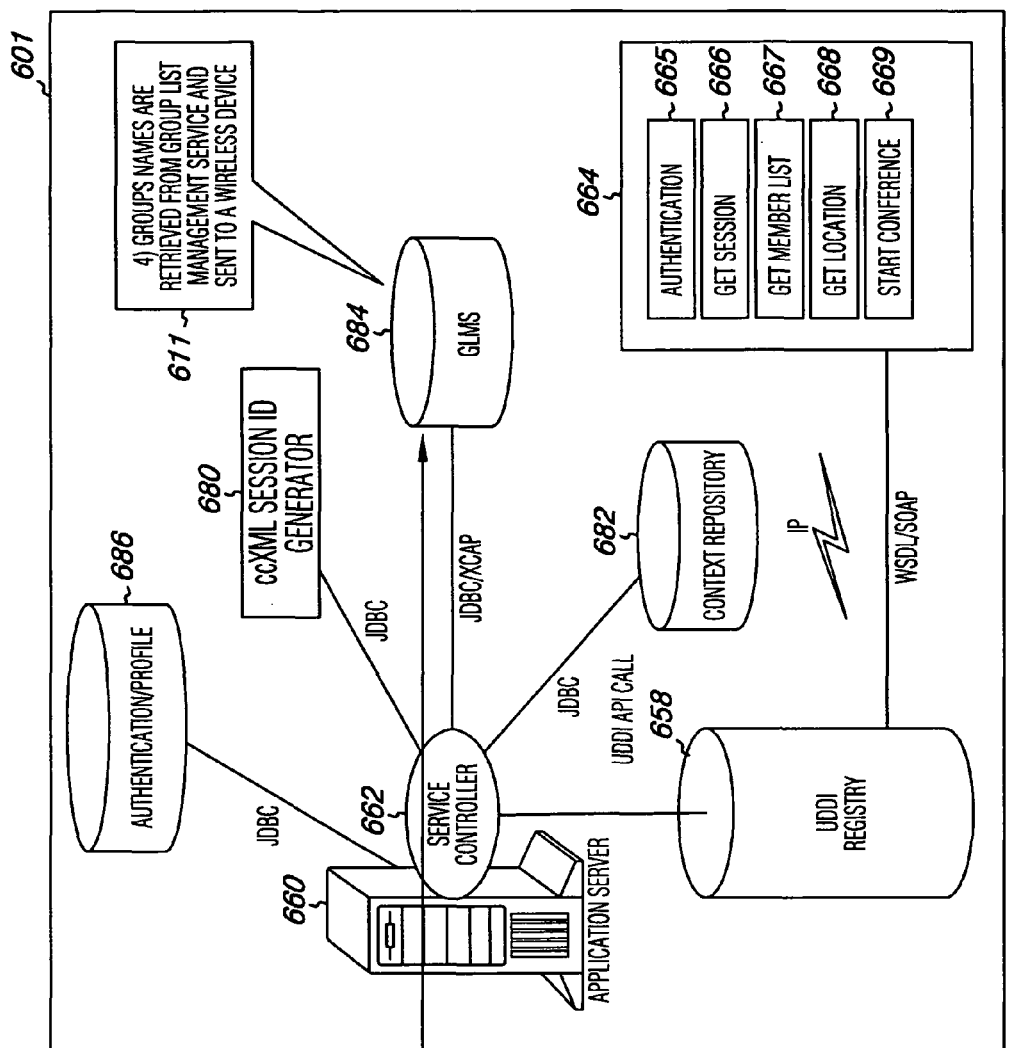
Figure 6:
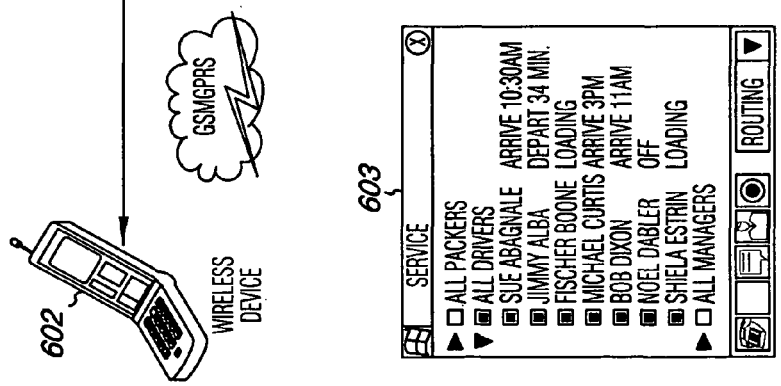

As shown at block 611 in FIG. 6, the user of the application created and provided to the wireless device 602 can use the application in cooperation of the service controller 662 to retrieve group names from a group list management service (GLMS) 684. In this example, retrieving the group names from the GLMS 684 illustrates another web service which has been exposed in the SDP 601 and embedded by the application developer, using the development tool 270, to the application provided to the wireless device 602. Program instructions executing on the application server 660 can execute to retrieve group names from a GLMS again using an interface such as JDBC. As shown in block 603, the example illustrates a list of group names being retrieved in association with a "trucking service" application. Embodiments, however, are not limited to this example. This particular example is presented for ease of illustrating one example embodiment. Various other utilitarian applications that could be created by exposing the web services in the SDP 601 and facilitating access by a development tool 270 to create a myriad of applications that could be delivered to the wireless device 602.

Thus, in FIG. 6, this example application running on the wireless device 602 has been able to retrieve through use of the SDP 601 a menu 603 of various company employees, defined by groups, as part of the trucking service application thereon. In the menu 603, which can be displayed to a user on the wireless device 602, the various group names are classed according to "all packers", "all drivers", "all managers", etc., according to the application developer's design. In this particular illustration, the user of the application has selected from the menu more detail on the "all drivers" group list. This example application now displays on the wireless device 602 names of drivers and their respective status information.

Figure 7:
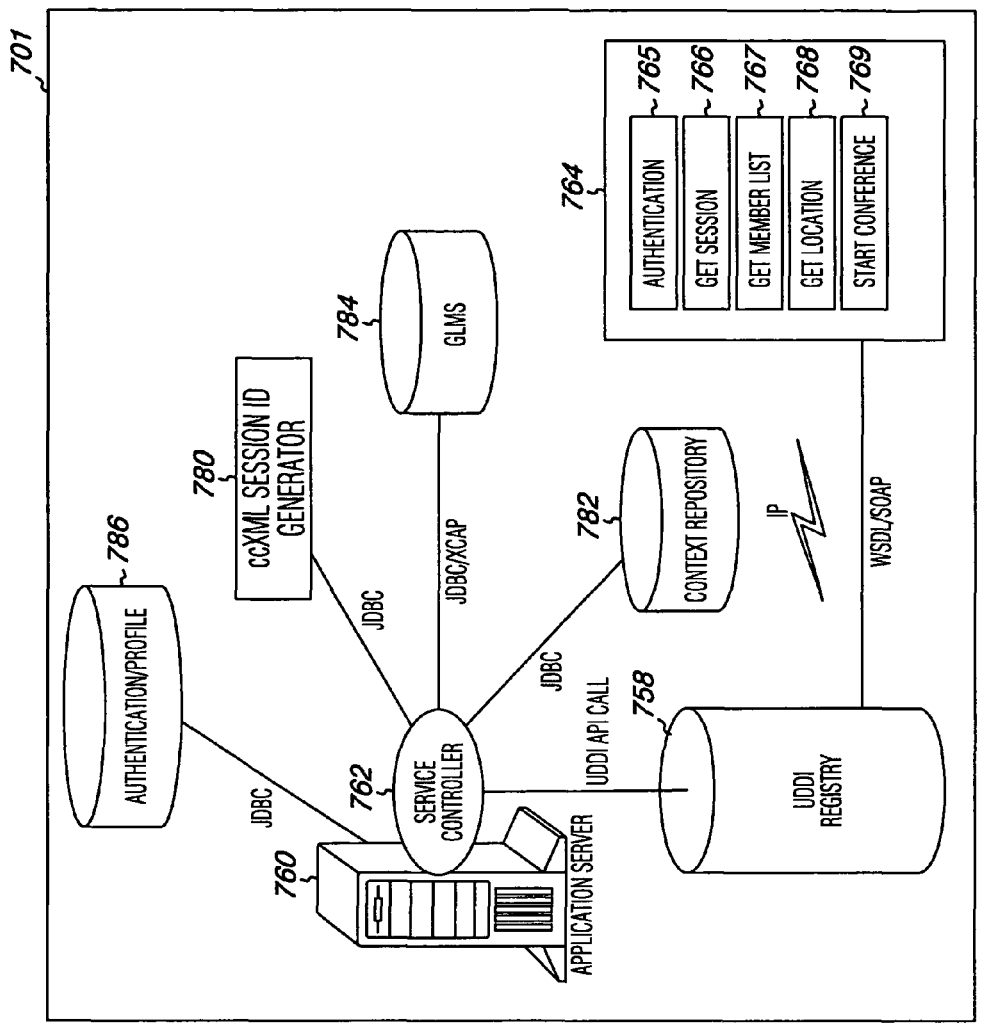
Figure 7:
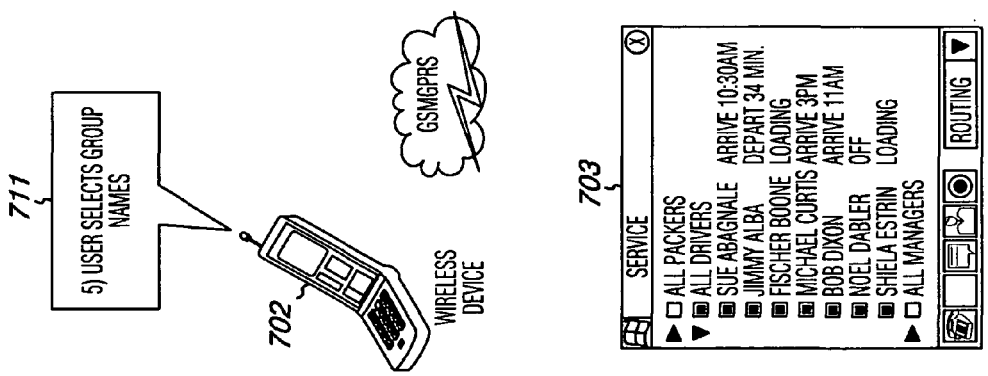

FIG. 7 continues to illustrate a flow sequence embodiment in connection with the "routing" session ID name and the "trucking service" application example. As shown in block 711, and the menu 703, the user has selected particular individual names of interest from among the menu of "all drivers". More or fewer names could be selected. Embodiments are not limited to the number shown selected in FIG. 7.

Figure 8A:
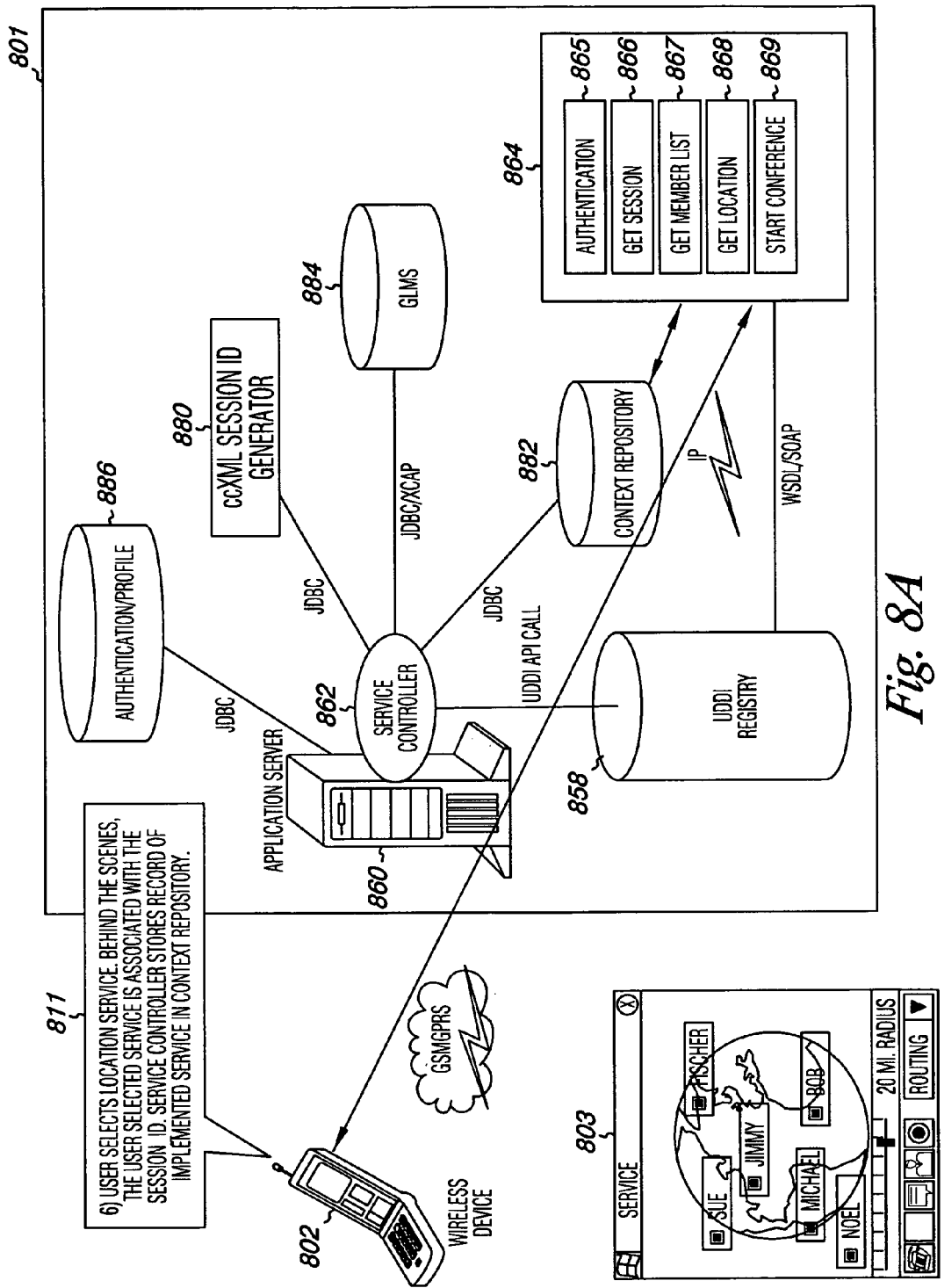

Continuing this example in FIG. 8A, as indicated in block 811, a user of the "trucking service" application on the wireless device 802 selects a location service. Again, in this example, selecting a location service, e.g., third party web service, illustrates another web service which has been exposed in the SDP 801 and embedded by the application developer, using the development tool 270, and provided with the application on the wireless device 802.

Program instructions on the application server 860 will execute to associate the user selected service "get location" with the session ID, e.g., named "routing", connected with the PTT telephony session. The service controller 862 will execute instructions to store, e.g., add, additional information associated with this implemented service in connection with the session ID in the context repository 882.

Additionally, as the selection activates an application on the application server, acting as a user endpoint or client of the PTT telephony session, the application will extract information about the session context, e.g., the participants Sue, Jimmy, Fischer, Michael, Bob, Noel, and Sheila shown in FIG. 7, using the session ID. The program instructions then execute to use this session context as input to invoke the second application in the telephony session, e.g., the "get location" service. According to the design of the trucking service application on the wireless device 802, a user may enter additional parameters to the "get location" service request such as restricting the location search to those selected participants within a twenty mile radius. In FIG. 8A, using the session context and any user provided additional parameter, e.g., twenty mile radius, as inputs the program instructions execute to invoke the get location application and can provide the location information of desired participants of the PTT session to a display of the wireless device 802. Hence, FIG. 8A illustrates a display, e.g., menu 803, of the wireless device 802 showing the location of session participants named Sue, Fischer, Jimmy, Michael, Noel, and Bob who are within a twenty mile radius of the wireless device 802. Embodiments are not limited to this example. Along with the above described action, the service controller 862 of the application server 860 will execute program instructions to store the additional information retrieved by the "get location" service in the context repository 882 in association with the session ID named "routing".

Figure 8B:
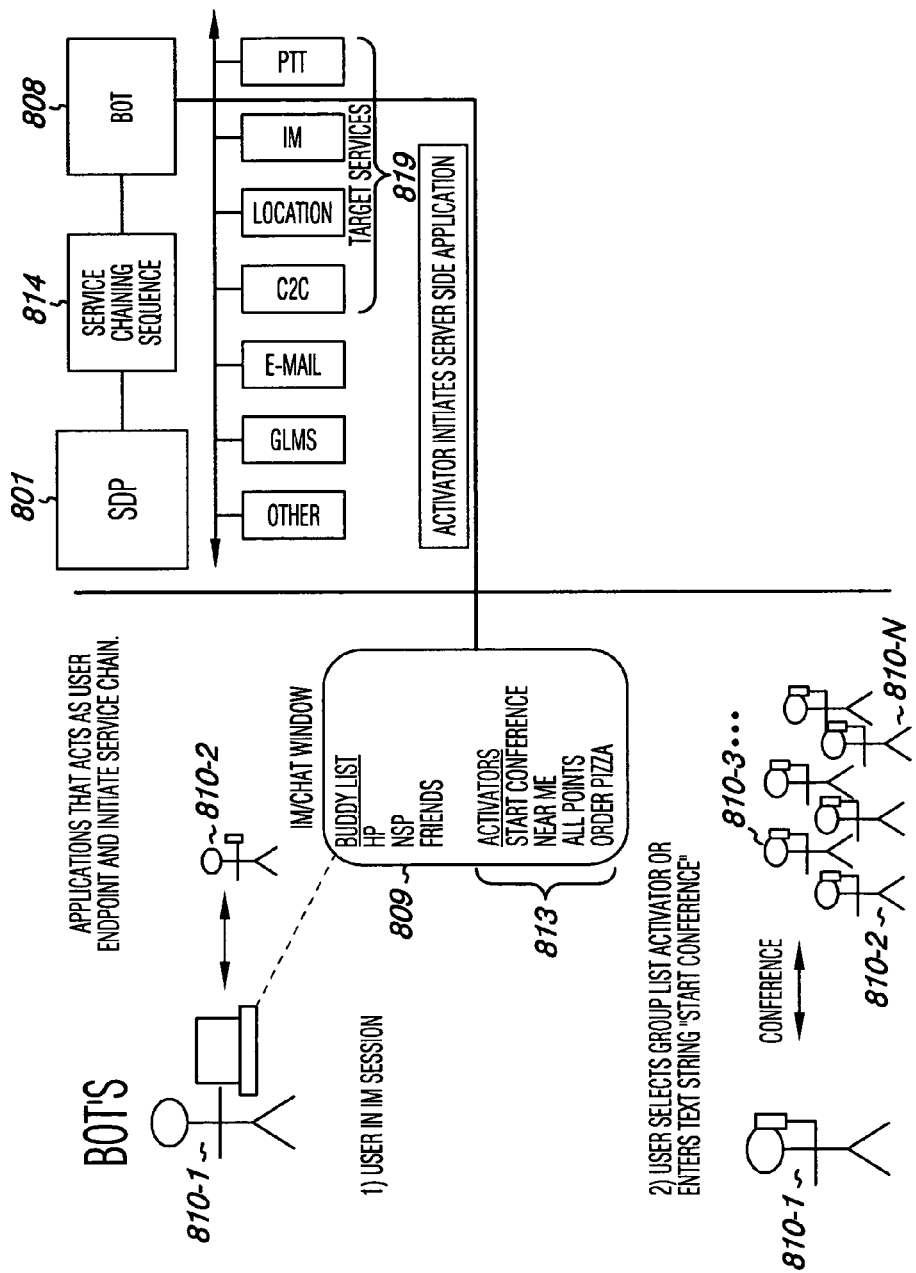

FIG. 8B illustrates one embodiment, not to the exclusion of others, in which program instructions on the wireless device 802, e.g., being used by a user 810-1, execute to treat the selection of the service "get location" as an "activator". The activator interfaces with a service chaining agent, or BOT (robot) 808, which then initiates server side applications on the application server (860 in FIG. 8A) through a service chaining sequence 814. In this example embodiment, the BOT 808 acts as a user endpoint to initiate a service or service chain and can serve as a gateway between the user 810-1, or wireless device (802 in FIG. 8A) and the service chaining sequence 814 on the application server 860. That is, according to previously discussed embodiments, existing implementations of an application like PTT and IM are modified in order to participate in services chaining, e.g., implementations are modified to support the extraction of session participants and supply these parameters to the next application in a chain.

In the example embodiment of FIG. 8B, however, the BOTs 808 serve as a gateway to services, e.g., a gateway to an IM client such as Jabber IM. The use of BOTs 808 act as clients to a PTT or IM telephony session environment. The BOTs 808, acting as PTT and/or IM clients, can be used to extract parameters and to subsequently use the parameters for the next application in the chain. Existing wireless device 802 application implementation may use the BOTs 808 embodiment of FIG. 8B. Program instructions of the BOT 808 execute to extract information about the session and execute to invoke another application, using parameters that the BOT extracts about the PTT telephony session. These parameters can include session participants, presence details, phone numbers, etc., using a service chaining agent to coordinate an existing telephony client with a web service application.

In FIG. 8B, a user 810-1 can be in a telephony session with another person and/or application using an existing telephony client, e.g., an instant messaging (IM) telephony application. In FIG. 8B, user 810-1 is shown communicating with user 810-2 in an IM telephony session. Further, the IM telephony client can be on a computing device, e.g., laptop, desktop, mobile device (e.g., 802 in FIG. 8A), etc., and can provide an IM chat window 809 which displays a number of client endpoints. For example, the chat window 809 displays a buddy list including a number of selectable client endpoints, e.g., various group lists (HP, NSP, and FRIENDS).

A number of activators 813 are also provided as client endpoints in association with the buddy lists. These activators 813 provide connections to a BOT 808, e.g., gateway, to initiate server side applications on an SDP 801. In FIG. 8B the activators 813 are illustrated as including "start conference", "near me", "all points bulletin", and "order pizza", etc. Embodiments, however, are not limited to these examples.

The SDP 801 includes program instructions which can execute to coordinate a service chaining sequence 814 in association with a BOT 808. That is, the BOT 808 is provided as instructions that can execute to store and retrieve session context, e.g., session parameters including such information as session participants, participant addresses, participant presence status, phone numbers, etc., associated with IM session from a context repository based on a session ID. Program instructions of the BOT 808 execute to retrieve this information from the IM or PTT environment and then use this session context as an input to other applications. By creating a session ID which enumerates that instance of a session and storing the session parameters, i.e., session context, in a context repository a BOT 808 can execute to use the IM session context to invoke another service, e.g., as input to the next application in the chain.

As illustrated in FIG. 8B, a BOT 808 can facilitate access to a number of target services 819. In FIG. 8B, PTT, IM, location, click to connect (C2C), email, group list management services (GLMS), etc., are illustrated as example target services 819 the BOT 808 can access. Embodiments, however, are not limited to these examples. BOTs 808 can execute to provide access to audio conference services, web conference services, video streaming, messaging, push to X, location services, voice recognizer, all points bulletin, near me, start camera, remember to do, order me pizza, media, voice forwarding, and other services, etc.

In FIG. 8B, a user 810-1 can click select one of these group list activators 813 or enter a text string to execute the activator 813 instructions. In response the activator 811 instructions execute to connect with a gateway to initiate a server side application. In the example of FIG. 8B, a user has selected a group list activator or entered a text string "start conference". Various text strings, e.g., /meet, /find, /google/ user name, /web conference, /talk, etc., can be entered by a user 810-1 in the IM session to initiate various server side applications to target services 819. As described in FIG. 2B URI-WSDL (e.g., location and access) information for a particular web service can be obtained through a UDDI API call to a UDDI registry (258 in FIG. 2B) in the SDP 801. Access to the conference web service, e.g., WebX or Breeze, etc., can be provided through WSDL documents and SOAP protocol. In FIG. 8B, the BOT 808 has executed to use the session context to connect present and new session participants 810-1, 810-2, . . . , 810-N, into a conference, e.g., a conference call, web conference, etc. The designator "N" is intended to represent that a number of session participants may be connected by the BOT 808 upon the BOT 808 retrieving the session context from a context repository based on the session ID associated with the IM session. Further, the BOT 808 program instructions can execute to store information associated in with the conference service to add to the session context associated with IM session. By way of example, and not by way of limitation, BOT 808 program instructions can execute to provide a session pointer to the universal resource indicator (URI) of the conference service to the context repository for later use. One example of providing a session pointer to the URI is described in the copending application, "Telephony and Web Services Coordination".

Hence, in FIG. 8B, various activator services 813 can be selected by a user 810-1 of a mobile device 202 to connect to and message BOTs 808 serving as a gateway to web services, e.g., target services 819. The BOTs 808-1 can act as a client endpoint, e.g., a member of a group list to an existing telephony client such as PTT client and/or an IM client. That is, BOTs 808 can be provided which look and act like a buddy on the buddy list. The BOT 808 is an application that responds as if it were a person by responding to IM prompts or by responding with audio talk bursts in the case of PTT. The BOT 808 includes executable instructions to retrieve session context from the IM or PTT environment and then use this session context as an input to the service chaining sequence 814 associated with the SDP 801. By using BOTs 808, application integration can be accomplished without the need for existing application modification. Embodiments, however, are not limited to these examples.

Figure 9:
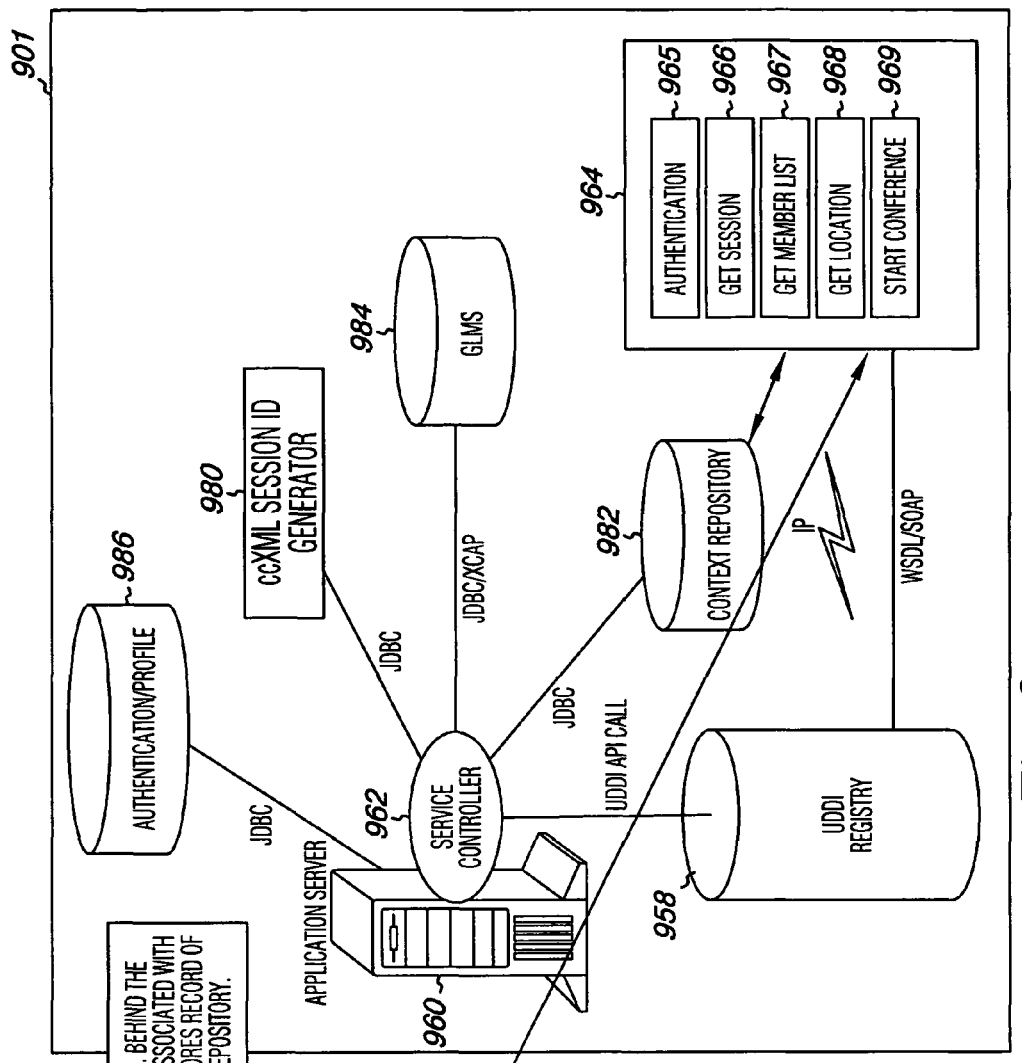

FIG. 9 additionally illustrates the service chaining continued further to applications in a service chain. For example, a user of the "trucking service" application on the wireless device 902 could now select a third application, e.g., a conference service, as indicated in 911. In FIG. 9, when the user selects a "conference service" on the wireless device 902 within this PTT telephony session the selection will serve as an activator initiating a conference service application on the application server 966. As mentioned above, in various embodiments the selection of the conference service will be handled as an activator of a BOT on the application server 960. This BOT will use the session ID associated with the PTT telephony session, e.g., the session ID named "routing", to extract, i.e., retrieve, the session context accumulated to this point in the context repository 982. Alternatively, using the development tool 270 the application developer can embed in applications implemented on the wireless device 902, e.g., the trucking service application, the ability for services, e.g., group lists, location, conference, etc., to be associated with a session ID.

Continuing the examples above, program instructions on the application server 960 will execute to associate the user selected "conference service" with the session ID, e.g., named "routing", connected with the PTT telephony session. The service controller 962 will execute instructions to store, e.g., add, additional information associated with this implemented service in connection with the session ID in the context repository 982.

Additionally, as the selection activates an application on the application server, acting as a user endpoint or client of the PTT telephony session, the application, e.g., a BOT application, will extract information about the session context, e.g., the participants Sue, Fischer, Jimmy, Michael, Noel, and Bob selected in association with the location service shown in FIG. 8A, using the session ID. The program instructions then execute to use this session context as input to invoke the third application in the telephony session, e.g., the "conference service". Thus, in this example, the session context will include the participants' phone numbers, addresses, location, etc. As noted above, according to the design of the particular application on the wireless device 902, e.g., trucking service application, a user may enter additional parameters to the "conference service" request such as restricting the participants of the conference service to a subset of the participants selected in association with the location service shown in FIG. 8.

In FIG. 9, using the session context along with any user provided additional parameter(s), e.g., a subset and/or addition of participants, as inputs the program instructions execute to invoke the "conference service" application and can conference the desired participants to the PTT session. The above noted copending application, entitled "Telephony and Web Service Coordination", provides an example in which ccXML can be used to coordinate telephony events in association with a session ID and the manner through which the session ID can be used to extend the functionality of ccXML to web services. That application provides additional description for the manner in which, using the ccXML session ID and event handling mechanisms, a session ID can be associated with a session context to coordinate a web services environment with the telephony environment.

In FIG. 9, the application on the on the wireless device 902 may also be able to display a conference connection state of the participants to the conference service including various information extracted from the session context in the context repository 982. Thus in the example embodiment of FIG. 9, a menu display, e.g., menu 903, on the wireless device 902 can show the participants, their location, and their connection status. Menu 903 illustrates participant Sue is connected and is fourteen miles away, participant Liam (who may have been added by the user as an additional participant to the session context from the previous session context in FIGS. 8A and 8B's discussion) is connected and is twenty-four miles away, and participant Bob is not yet connected and is eight miles away. Again, embodiments are not limited to this example. Along with the above described action, the service controller 962 will execute program instructions to store the additional information retrieved by the "conference service" in the context repository 982 in association with the session ID named "routing".

Session context may include a number of types of information including, but not limited to: a user ID; a group ID; a user name; a preferred language; a status; a subscriber or user's first name; a subscriber or user's last name; a last login timestamp; a present location of a mobile device and/or a user (including a street, a street number, a zip, a city, and a country); a residence or work location of the user; a gender; a mobile subscription; a mobile subscriber ISDN or IMSI number; an email address; an IP address; a SMS address; personal interest information, e.g., hobby, clothing, culinary, or other interest information relating to a user; current location information obtained from a PLMN, a PwLAN, and/or a GPS enabled device, among others. Embodiments of the invention are not limited to these examples.

Further, by way of example and not by way of limitation, it is noted that in various embodiments a user request from the mobile device to the SDP can be implemented using a wireless application protocol (WAP) application conducted via a series of web markup language (WML) pages on the device 902 browser. Embodiments are not limited to the examples herein. And, in various embodiments the web services interfaces can include program applications having management, control, access, and business logic instructions which can execute to handle requests associated with a session ID stored in a context repository. And, in various embodiments, web service interfaces may use web services definition language (WSDL) documents to store session context in a context repository. In such embodiments, the WSDL document can be automatically generated from a Java Integrated Development Environment (IDE). Additionally, session context information can be submitted and/or retrieved in the form of a WSDL document and transmitted via simple object access protocol (SOAP) to the context repository. SOAP is a message-based protocol based on extensible markup language (XML) for accessing services on the Web. SOAP employs XML syntax to send text commands across the Internet using hypertext transport protocol. In alternative embodiments, the session context information request is submitted to and retrieved from the context repository using Java Messaging Service (JMS), using a messaging middleware application, and/or using a common object request broker architecture (CORBA).

Figure 10:
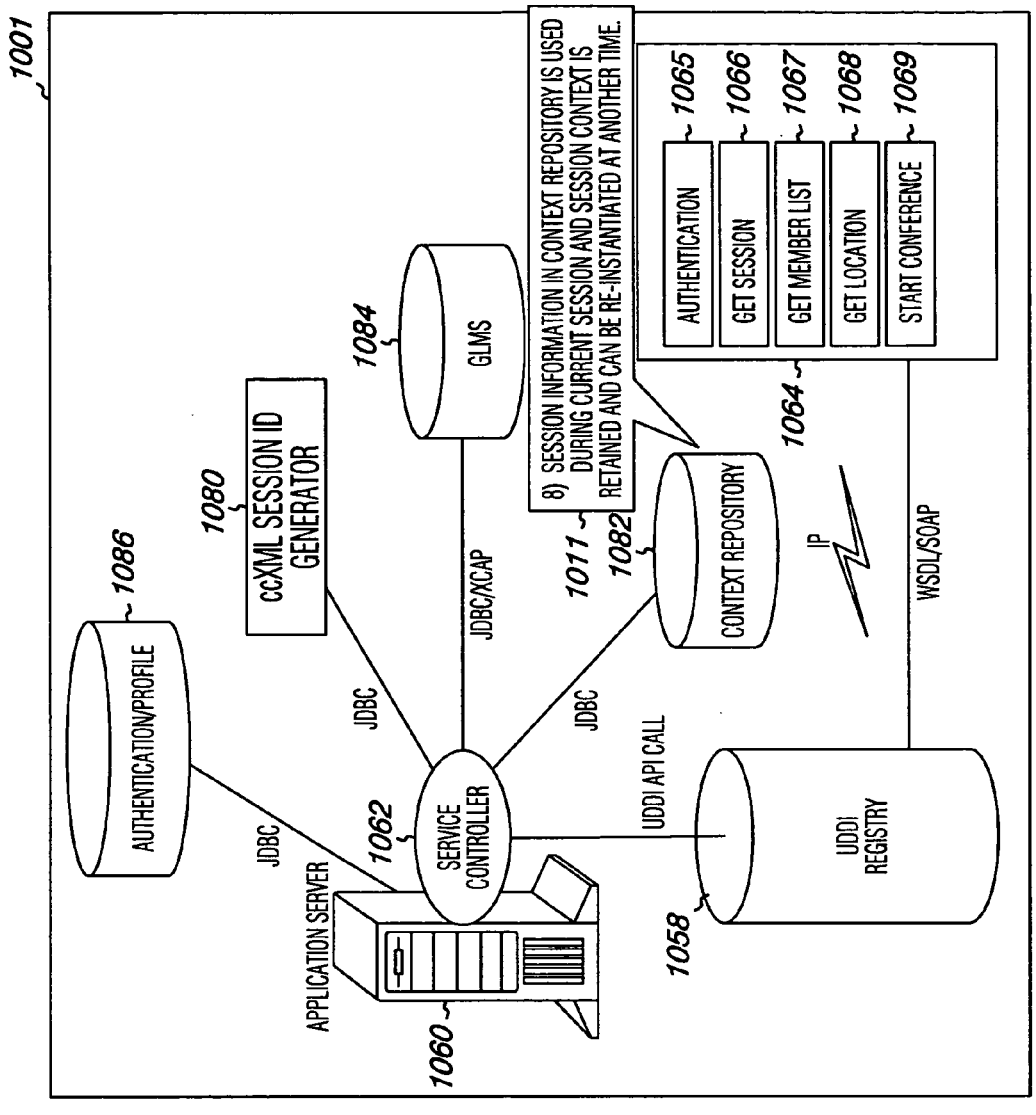
Figure 10:
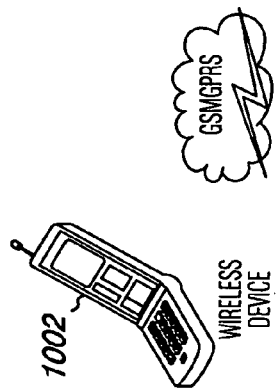

Thus, as shown in FIG. 10 and according to various embodiments, a context repository 1082 is used to store the participants of the current application, e.g., PTT, and then session context from this context repository is used to form a call to conferencing or location services or email, etc. As indicated in block 1011, this session context can continue to be used during the current session and session context is retained and can be reinstated at another time. Hence, the session context can continue to be used to invoke other interesting services such as to send an email and/or SMS to one or more participants in a conference call that contains information about the meeting, the web location of a web conference, etc. Using the session context of the current application to supply inputs to the next application in the chain supports the ability to "chain" from one atomic application to another atomic application and produces a superset of application functionality greater than the sum of features of each of the single atomic applications. The embodiments described herein thus also provide a defined way for third party applications to be integrated together while not having to involve the original application developers.

Figure 11:
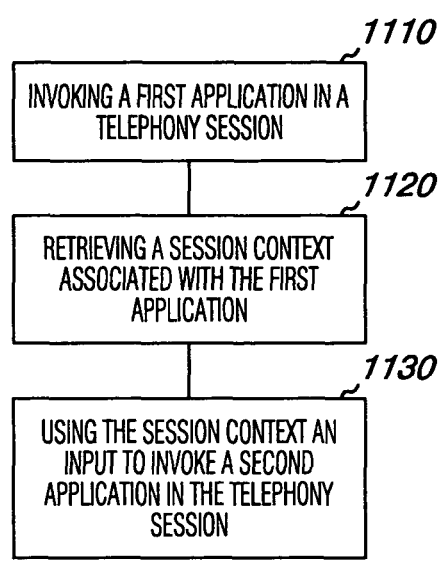
FIGS. 11 and 12 illustrate method embodiments of the present disclosure.
Figure 12:
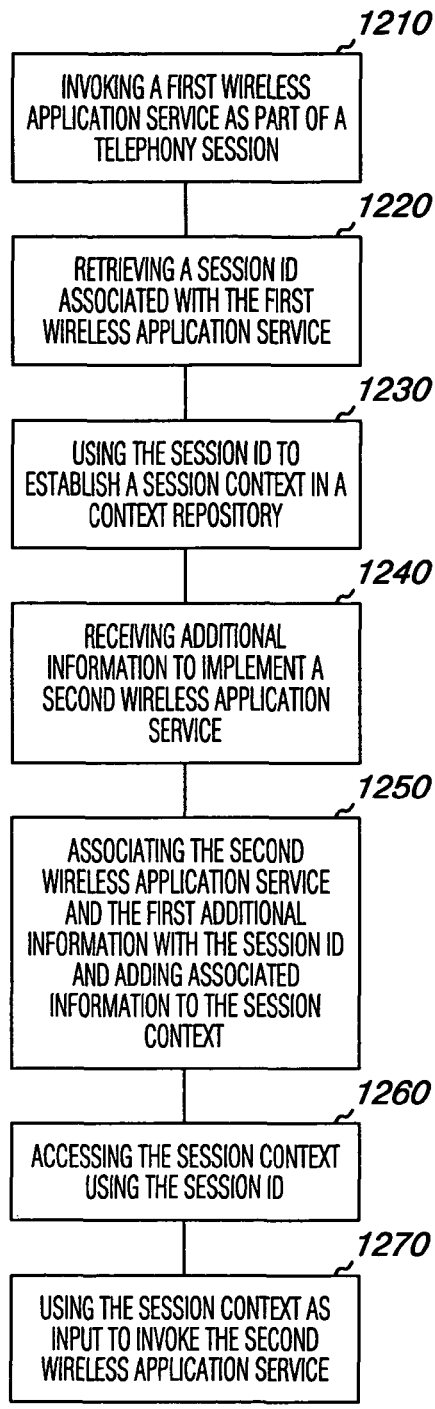

FIGS. 11 and 12 illustrate method embodiments of the present disclosure. In FIG. 11, program instructions execute to invoke a first application in a telephony session as shown at block 1110. At block 1120, program instructions execute to retrieve a session context associated with the first application. Block 1130 illustrates that program instructions execute to use the session context as an input to invoke a second application in the telephony session.

In FIG. 12, program instructions execute to invoke a first wireless application service as part of a telephony session. In block 1220, the method includes retrieving a session ID associated with the first wireless application service. Block 1230 depicts using the session ID to establish a session context in a context repository. In block 1240, the method includes receiving additional information to implement a second wireless application services. As shown at block 1250, the method includes associating the second wireless application service and the received additional information with the session ID and adding associated information to the session context. In block 1260, the method includes accessing the session context using the session ID. In block 1270, the session context is used as an input to invoke the second wireless application service.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for telephony service chaining, comprising:
    invoking a first application to establish a telephony session of a telephone call between participants;
    in response to the establishing of the telephony session, creating a session ID and session context for the telephony session, wherein the session context includes a list of the participants and is stored in a data storage;
    during the telephony session, receiving a request from one of the participants in the telephony session for information related to another participant in the telephony session;
    identifying the session ID of the telephony session from the request;
    using the identified session ID to retrieve an identifier of the other participant from the session context stored in the data storage;
    using the retrieved identifier of the other participant as an input to invoke a web service;
    retrieving from the web service information related to the other participant in the telephony session; and
    during the telephony session, providing the retrieved information related to the other participant to the participant that requested the information.

2. The method of claim 1, wherein the session context includes names of the participants in the telephony session.

3. The method of claim 1, wherein the telephony session and the web service are atomic applications.

4. The method of claim 1, wherein the telephony session is a push-to-talk (PTT) session including a buddy list feature.

5. The method of claim 4, wherein the method includes:
    storing the participants of the PTT session in the data storage; and
    accessing the buddy list from the data storage.

6. The method of claim 5, wherein the method includes using the buddy list as input to invoke an application selected from the group of:
    a conference service;
    a location service;
    a short message service; and
    an email service.

7. The method of claim 1, wherein the session context is used throughout the telephony session and is retained and re-instantiated subsequent to the telephony session.

8. A method for telephony service chaining, comprising:
    invoking a telephony session of a telephone call between participants;
    in response to the invoking of the telephony session, creating a session ID and a session context for the telephony session, wherein the session context includes a list of the participants;
    storing the session ID and session context in a context repository;
    during the telephony session, receiving a request from one of the participants in the telephony session for additional information of another participant in the telephony session;
    identifying the session ID from the request;
    using the session ID to retrieve an identifier of the other participant from the session context stored in the context repository;
    using the retrieved identifier of the other participant as input to invoke a web service; and
    during the telephony session, providing the information of the other participant retrieved from the web service to the participant that requested the information.

9. The method of claim 8, wherein the method further includes:
    accessing the session context using the session ID prior to retrieving the identifier of the other participant.

10. The method of claim 9, wherein the method includes:
    receiving additional information to implement an application service;
    associating the application service and the additional information with the session ID of the telephony session to add to the session context;
    accessing the session context using the session ID; and
    using the session context as input to invoke the application service.

11. The method of claim 10, wherein the telephony session is a push to talk (PTT) session; and
    wherein the method includes retrieving a group list from a group list management service in association with the PTT session and forwarding the group list to the first application service.

12. The method of claim 11, wherein receiving additional information to implement the application service includes receiving selected names from among the group list.

13. The method of claim 12, wherein the web service includes a location service to identify location information of the other participant, and wherein adding to the session context includes adding location information for selected names from among the group list.

14. The method of claim 13, wherein the application service is a conferencing service, and wherein:
    receiving additional information to implement the application service includes receiving selected locations; and
    wherein using the session context as input to invoke the application service includes using phone numbers for the selected names at the selected locations.

15. The method of claim 13, wherein the application service is a short message service, and wherein:
receiving additional information to implement the application service includes receiving selected locations; and
wherein using the session context as input to invoke the application service includes using text message addresses for the selected names at the selected locations.

16. The method of claim 13, wherein the application service is an email service, and wherein:
receiving additional information to implement the application service includes receiving selected locations; and
wherein using the session context as input to invoke the application service includes using email addresses for the selected names at the selected locations.

17. The method of claim 8, wherein the session ID is created using a call control XML application.

18. A method for service chaining, comprising:
launching a telephony session of a telephone call between participants;
in response to the launching of the telephony session, using a software agent (BOT) to create a session identification (ID) and a session context of the telephony session, wherein the session context includes a list of the participants in the telephone session;
during the telephony session, receiving a request, from one of the participants in the telephony session, for information of another participant in the telephony session;
identifying the session ID of the telephony session from the request;
using the identified session ID to retrieve an identifier of the other participant from the session context stored in a context repository;
using the retrieved identifier of the other participant to invoke a web service application to retrieve information of the other participant; and
during the telephony session, providing the retrieved information of the other participant to the participant that requested the information.

19. The method of claim 18, wherein the using the BOT to create a session ID is through a ccXML application.

20. The method of claim 19, wherein:
the launching a telephony session includes launching a push to talk (PTT) telephony session; and
the using a BOT to create a session ID includes using a PTT BOT to create the session ID.

21. The method of claim 19, wherein:
the launching a telephony session includes launching an instant messaging (IM) telephony session; and
the using a BOT to create a session ID includes using an IM BOT to create the session ID.

22. The method of claim 18, wherein using the session ID to retrieve the session context includes retrieving parameters associated with the telephony session selected from the group of
a session participant;
an address;
a presence status; and
a phone number.

23. The method of claim 18, wherein the method includes:
receiving additional information in association with the web service application;
adding the additional information to the session context in the context repository based on the session ID; and
using the BOT to retrieve the session context and to invoke another web service application.

24. A non-transitory computer readable storage device having executable instructions stored thereon to cause a device to:
invoke a telephony session of a telephone call between participants;
in response to the invoking of the telephony session, create a first session ID and a first session context for the telephony session;
store the first session context in a context repository;
during the telephony session, receive a request, from one of the participants in the telephony session, for information of another participant in the telephony session;
identify the first session ID of the telephony session from the request;
retrieve an identifier of the other participant in the first session context of the telephony session stored in the context repository based on the first session ID;
use the retrieved identifier of the other participant as an input to invoke a web service during the telephony session; and
provide the information of the other participant retrieved from the web service to the participant that requested the information during the telephony session.

25. The non-transitory computer readable storage device of claim 24, wherein the telephony session and the web service are atomic applications.

26. The non-transitory computer readable storage device of claim 24, wherein, to invoke the telephony session, the instructions cause the device to invoke a buddy list service in a push to talk telephony session.

27. The non-transitory computer readable storage device of claim 26, wherein the instructions cause the device to:
use the context repository to store names of the participants of the push to talk telephony session;
invoke a conference service feature using the retrieved identifier of the other participant; and
maintain a second session context for the conference service feature in the context repository and use the second session context to invoke an SMS message to the participants in the conference service feature.

28. A service chaining system, comprising:
an application server having access to a web service;
a wireless device with an application to request the web service from the application server over a network; and
wherein the application server includes program instructions which are executable to:
during a telephony session of a telephone call between the wireless device and another participant in the telephony session, receive a request from the wireless device for information of the other participant;
retrieve a session ID of the telephony session from the request;
using the session ID to retrieve an identifier of the other participant;
use the retrieved identifier of the other participant as an input to invoke a web service during the telephony session;
retrieve from the web service information of the other participant; and
during the telephony session, provide the retrieved information of the other participant to the wireless device.

29. The system of claim 28, wherein the application server includes program instructions which are executable to:
   expose an operator service; and
   expose the operator service to a development tool with the ability to associate a service implemented in the development tool with the session ID.

30. The system of claim 29, wherein the development tool includes a macromedia flash development tool.

31. The system of claim 29, wherein the operator service is selected from the group of:
   a push to talk service;
   an instant messaging service;
   a location service;
   a voice conferencing service;
   an email service;
   a general location management service; and
   a conferencing service.

32. The system of claim 28, wherein the web service is implemented using call control XML.

33. The system of claim 28, wherein the network is a global system for mobile general packet radio service network.

* * * * *